US012491529B2

(12) United States Patent
Stewart

(10) Patent No.: US 12,491,529 B2
(45) Date of Patent: Dec. 9, 2025

(54) CLEANING CONCENTRATE DISPENSER AND ASSOCIATED METHOD FOR USING THE SAME

(71) Applicant: Patrick Stewart, Saugatuck, MI (US)

(72) Inventor: Patrick Stewart, Saugatuck, MI (US)

( * ) Notice: Subject to any disclaimer, the term of this patent is extended or adjusted under 35 U.S.C. 154(b) by 223 days.

(21) Appl. No.: 18/226,836

(22) Filed: Jul. 27, 2023

(65) Prior Publication Data

US 2024/0033764 A1 Feb. 1, 2024

Related U.S. Application Data

(60) Provisional application No. 63/392,898, filed on Jul. 28, 2022.

(51) Int. Cl.
*B05B 12/08* (2006.01)
*B05B 9/04* (2006.01)
*B05B 15/60* (2018.01)

(52) U.S. Cl.
CPC .......... *B05B 12/081* (2013.01); *B05B 9/0403* (2013.01); *B05B 15/60* (2018.02)

(58) Field of Classification Search
None
See application file for complete search history.

(56) References Cited

U.S. PATENT DOCUMENTS 3,397,724 A 8/1968 Bolen et al.
D244,991 S 7/1977 Weckman et al.
4,125,632 A 11/1978 Vosti et al.
D259,405 S 6/1981 Drummond
D259,541 S 6/1981 Halbeisen et al.
4,318,489 A 3/1982 Snyder et al.
4,749,092 A 6/1988 Sugiura et al.
4,845,965 A 7/1989 Copeland et al.
4,865,206 A 9/1989 Behm et al.
D309,420 S 7/1990 Beaver
D311,136 S 10/1990 Barker et al.
D313,350 S 1/1991 Beaver
5,004,158 A 4/1991 Halem et al.
D329,816 S 9/1992 Beaver et al.
5,154,319 A 10/1992 Deininger et al.
D331,195 S 11/1992 Weckman
D335,454 S 5/1993 McLean et al.
D350,484 S 9/1994 Addis et al.
5,402,916 A 4/1995 Nottingham et al.
D363,667 S 10/1995 Baratta-Dragono et al.
D366,421 S 1/1996 Best
(Continued)

FOREIGN PATENT DOCUMENTS

DE 102012216817 3/2014
WO WO-2023180769 A2 * 9/2023 .......... B01F 33/8442
(Continued)

OTHER PUBLICATIONS

Office Action for U.S. Appl. No. 15/425,142 dated Mar. 8, 2018.

*Primary Examiner* — Paul R Durand
*Assistant Examiner* — Michael J. Melaragno
(74) *Attorney, Agent, or Firm* — King & Partners, PLC

(57) ABSTRACT

A cleaning concentrate dispenser assembly, including: a housing sub-assembly; an energy source; an RFID reader; a level sensor; a controller (printed circuit board); a cleaning concentrate reservoir; a dispensing pump; and a cleaning concentrate output.

20 Claims, 11 Drawing Sheets

INSERT RFID CONCENTRATE BOTTLE

(56) References Cited

U.S. PATENT DOCUMENTS

| | | | |
|---|---|---|---|
| D402,553 S | 12/1998 | Webster et al. | |
| 5,849,253 A | 12/1998 | Crossdale et al. | |
| D409,495 S | 5/1999 | Hartman et al. | |
| D420,918 S | 2/2000 | Hefter et al. | |
| 6,098,646 A | 8/2000 | Hennemann et al. | |
| 6,105,638 A | 8/2000 | Edwards et al. | |
| D430,798 S | 9/2000 | Stevens et al. | |
| 6,464,106 B1 | 10/2002 | Giblin | |
| D472,151 S | 3/2003 | Warren et al. | |
| 6,763,860 B2 * | 7/2004 | Jungmann | B01F 35/20 141/192 |
| 6,845,886 B2 | 1/2005 | Henry et al. | |
| D518,731 S | 4/2006 | Yourist et al. | |
| 7,090,098 B2 | 8/2006 | Livingston et al. | |
| D548,595 S | 8/2007 | Marasligiller et al. | |
| D553,501 S | 10/2007 | Arnett et al. | |
| D556,583 S | 12/2007 | Gurst et al. | |
| D571,217 S | 6/2008 | Bates et al. | |
| D573,884 S | 7/2008 | Crabtree et al. | |
| 7,439,859 B2 * | 10/2008 | Humphrey | G06Q 20/105 235/383 |
| D579,778 S | 11/2008 | De Gopegui et al. | |
| D584,155 S | 1/2009 | Lorio | |
| 7,472,609 B1 | 1/2009 | Larson et al. | |
| D595,137 S | 6/2009 | Bates et al. | |
| 7,624,922 B2 * | 12/2009 | Brown | B67D 7/346 235/383 |
| 7,654,421 B2 * | 2/2010 | Chan | D06F 33/37 340/572.1 |
| D627,231 S | 11/2010 | Lee et al. | |
| D637,916 S | 5/2011 | McNabb et al. | |
| D643,297 S | 8/2011 | Lee et al. | |
| D651,907 S | 1/2012 | Dennis et al. | |
| D661,193 S | 6/2012 | Merchant et al. | |
| 8,240,508 B2 * | 8/2012 | Wegelin | G05B 15/02 222/105 |
| D683,628 S | 6/2013 | Claassen | |
| D684,061 S | 6/2013 | Leslie et al. | |
| D685,642 S | 7/2013 | Leslie et al. | |
| D686,080 S | 7/2013 | Tomkins et al. | |
| D691,477 S | 10/2013 | Tomkins et al. | |
| D696,128 S | 12/2013 | Lindsay et al. | |
| D705,069 S | 5/2014 | Crisanti et al. | |
| D714,647 S | 10/2014 | Kersten | |
| D716,146 S | 10/2014 | Palmatier et al. | |
| 8,919,587 B2 | 12/2014 | Howell et al. | |
| D721,587 S | 1/2015 | Bos et al. | |
| 8,961,893 B2 | 2/2015 | Fleming et al. | |
| D723,927 S | 3/2015 | Fish et al. | |
| D724,435 S | 3/2015 | Kaufman et al. | |
| D730,190 S | 5/2015 | Lindsay et al. | |
| 9,027,790 B2 | 5/2015 | Caivarella et al. | |
| D733,567 S | 7/2015 | Lindsay et al. | |
| D736,637 S | 8/2015 | Castillo Higareda et al. | |
| D739,247 S | 9/2015 | McDonnell | |
| D739,749 S | 9/2015 | Bhattacharyya et al. | |
| D741,183 S | 10/2015 | Cannamela et al. | |
| D741,715 S | 10/2015 | Casscles et al. | |
| D743,806 S | 11/2015 | Lang et al. | |
| 9,221,596 B2 | 12/2015 | Patel | |
| D772,714 S | 11/2016 | Clemence et al. | |
| D772,715 S | 11/2016 | Clemence et al. | |
| 9,539,598 B2 | 1/2017 | Caivarella et al. | |
| 9,618,376 B2 | 4/2017 | Carbone, II et al. | |
| D785,456 S | 5/2017 | Clemence et al. | |
| D785,457 S | 5/2017 | Clemence et al. | |
| D788,587 S | 6/2017 | Clemence et al. | |
| 9,867,507 B2 | 1/2018 | Toh | |
| D821,879 S | 7/2018 | Clemence et al. | |
| D821,881 S | 7/2018 | Clemence et al. | |
| D822,492 S | 7/2018 | Clemence et al. | |
| 10,081,455 B2 | 9/2018 | Clemence et al. | |
| D832,105 S | 10/2018 | Clemence et al. | |
| D832,108 S | 10/2018 | Clemence et al. | |
| 10,213,751 B2 * | 2/2019 | Snider | B01F 21/22 |
| D891,929 S | 8/2020 | Clemence et al. | |
| 10,751,680 B2 | 8/2020 | Carbone, II et al. | |
| 11,691,864 B2 * | 7/2023 | Garcia Tebar | B67D 1/0004 222/129 |
| 11,713,164 B2 | 8/2023 | Clemence et al. | |
| 2005/0139609 A1 | 6/2005 | Giblin et al. | |
| 2006/0101575 A1 | 5/2006 | Louis | |
| 2006/0289679 A1 * | 12/2006 | Johnson | B05B 1/3046 222/333 |
| 2007/0045222 A1 | 3/2007 | Denner et al. | |
| 2007/0210123 A1 | 9/2007 | Penny et al. | |
| 2007/0215239 A1 * | 9/2007 | Dorney | G06Q 20/342 222/146.2 |
| 2010/0146587 A1 * | 6/2010 | Sholes | B67D 7/348 726/2 |
| 2010/0163573 A1 * | 7/2010 | Wegelin | G05B 15/02 222/325 |
| 2011/0082595 A1 * | 4/2011 | Mehus | B67D 7/145 700/283 |
| 2012/0267381 A1 | 10/2012 | Trude et al. | |
| 2016/0346743 A1 * | 12/2016 | Snider | B01F 35/2207 |
| 2023/0158461 A1 * | 5/2023 | Papp | G01N 35/1002 422/63 |
| 2024/0033764 A1 * | 2/2024 | Stewart | B05B 12/081 |

FOREIGN PATENT DOCUMENTS

| | | |
|---|---|---|
| WO | WO-2023180775 A1 * | 9/2023 |
| WO | WO-2023180776 A1 * | 9/2023 |

* cited by examiner

INSERT RFID CONCENTRATE BOTTLE

DEVICE IDENTIFIES & LEVEL SENSES CONCENTRATE

INSERT, IDENTIFY, AND LEVEL SENSE RDIF SPRAY BOTTLE

DISPENSING & VERIFY CORRECT CONCENTRATE AMOUNT

INSERT, DETECT & FILL RDC

FILL VARIOUS RDC FOR ALL CLEANING PURPOSES

USE DISPENSOR TO FILL A MOP BUCKET

USE HOSE AND RDC FOR REMOTE BUCKET FILLING

CLEANING CONCENTRATE DISPENSER AND ASSOCIATED METHOD FOR USING THE SAME

CROSS-REFERENCE TO RELATED APPLICATIONS

This application claims the benefit of U.S. Provisional Application Ser. No. 63/392,898, entitled "CLEANING CONCENTRATE DISPENSER AND ASSOCIATED METHOD FOR USING THE SAME," filed Jul. 28, 2022—which is hereby incorporated herein by reference in its entirety, including all references cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to dispensers, and, more particularly, to cleaning concentrate dispensers which dispense, for example, cleaning concentrate (or other chemicals) into a container which is then filled with water to complete the solution. The solution is then available for use for its intended purpose. The present invention further relates to methods for using the cleaning concentrate dispenser assemblies disclosed herein.

By way of contrast, the cleaning industry currently uses chemical concentrates, diluted on-site with dispensers, using water driven vacuum devices to mix the chemicals with the proper amount of water for ready-use solutions. There are several universal, structural weaknesses with these systems. First, the dispensers must be placed at a water source with legal backflow protection. This is expensive and limits distribution of the dispensers throughout the facility. Second, vacuum dilution is relatively inaccurate (+/−5%) and susceptible to higher inaccuracies due to water pressure variables. Third, vacuum dilution devices tend to build up with water impurities, and become less accurate or inoperative. With time, the devices require difficult and costly maintenance. Fourth, vacuum dilution devices are expensive to make and install. Lastly, dilutions over 500:1 (water to chemical) are not practical because the dilutor dispensers lack sufficient precision.

2. Background Art

Dispenser assemblies and their sub-assemblies have been known in the art for years and are the subject of a plurality of patents and publications, including: U.S. Pat. No. 10,751,680 entitled "Apparatus, Method and System for Calibrating a Liquid Dispensing System," U.S. Pat. No. 9,867,507 entitled "Dispenser," U.S. Pat. No. 9,539,598 entitled "Dispensers for Diluting a Concentrated Liquid and Dispensing the Diluted Concentrate," U.S. Pat. No. 8,961,893 entitled "Automated Chemical Diluter System Having Disposable Components," U.S. Pat. No. 7,090,098 entitled "Metering and Dispensing Closure," U.S. Pat. No. 6,105,638 "Dispensing System and Method for Dispensing a Concentrated Product and Container for use Therewith," U.S. Pat. No. 5,849,253 entitled "Dispenser," U.S. Pat. No. 5,154,319 entitled "Apparatus for the Dispensing of Liquids in Measured Amounts," U.S. Patent Application Publication Number 2006/0101575 entitled "Dispensing System and Method, and Injector Therefor," and German Patent Number DE 102012216817 entitled "Metering Device for a Fluid"—all of which are hereby incorporated herein by reference in their entirety including the references cited therein.

U.S. Pat. No. 10,751,680 appears to disclose an apparatus, method and system providing for calibration and/or control of a liquid dispensing system. The hand-held calibration auditing tool includes a flow meter with inlets adapted for quick connection to one or more liquid inputs to a liquid dispensing system. A sensor having a data output of liquid flow information for a liquid input to the dispensing system is operably connected to a controller to receive the liquid flow information for the liquid input. The controller provides a dilution rate and other liquid flow information for a liquid product input to a dispenser.

U.S. Pat. No. 9,867,507 appears to disclose a dispenser that includes a housing defining an internal volume. A cartridge is coupled with the housing. A tube extends into the internal volume of the housing. A first liquid is drawn from the internal volume into the tube through a first inlet in the tube when the pump assembly is actuated. A connecting member is positioned in the internal volume of the housing and coupled to the cartridge and the tube. A second liquid is drawn from the cartridge, through the connecting member, and into the tube through a second inlet in the tube when the pump assembly is actuated.

U.S. Pat. No. 9,539,598 appears to disclose exemplary embodiments of dispensers. One exemplary dispenser is a soap or sanitizer dispenser. The dispenser includes a housing. A removable and replaceable concentrate container for holding concentrated soap or sanitizer is located within the housing. A concentrate pump is in fluid communication with the concentrate container. A diluent container for holding a liquid is also located within the housing and a diluent pump for pumping the diluent is also included. The dispenser includes a mixing chamber in fluid communication with the concentrate pump and the diluent pump. The dispenser includes an outlet. When concentrated soap or sanitizer is pumped from the concentrate container, it mixes with diluent pumped from the diluent container to form a diluted mixture. The diluted mixture is dispensed at the outlet of the dispenser.

U.S. Pat. No. 8,961,893 appears to disclose a chemical diluter system that includes a housing. A container is mounted in the housing and is adapted for storing soluble flowable chemical solids. A mixing chamber is disposed within the housing and adjacent to the container. A disposable dispenser is attached to the container for automatically dispensing a measured amount of the chemical solids from the container into the mixing chamber via gravity flow. The mixing chamber is adapted to receive fluid for dissolution of the chemical solids and for dispensing a diluted chemical solution of the chemical solids.

U.S. Pat. No. 7,090,098 appears to disclose a metering and dispensing closure for a container wherein two rotatable disks rotate in conjunction with a stationary cap member to afford accurate measuring of a powder material and dispensing of it. The disks and the container cap afford a consistent measuring of the powder material, as well as provide a variety of drive members which can be utilized with the dispensing closure.

U.S. Pat. No. 6,105,638 appears to disclose a dispensing system and method of dispensing utilizing a container housing a concentrated product which is filled with a diluent to form a use dilution, then is subsequently installed into a dispenser having means for automatically opening the container to (give the dispenser access to the use dilution. The container includes a cap disposed thereon with a pierceable member that permits access to the interior cavity of the container when pierced. The cap is removable to permit the container to be filled with a diluent prior to installation in the dispenser.

U.S. Pat. No. 5,849,253 appears to disclose a dispenser for powdered, granular, pellet, briquette or tablet-like material. The dispenser includes a dispenser head through which the material dissolved in water can be dispensed. A spray device is provided at the head to spray water onto the material provided in the dispenser head. A suspension device is provided to suspend a bag containing the material above the dispenser head. The bag in its suspended orientation has a fastener along the bottom end which closes the bottom end of the bag. The fastener is not, however, releasable until after the bag is mounted in the dispenser. Then the fastener is releasable to allow the contents thereof to fall by gravity onto the dispenser head. The dispenser provides a system, which normally avoids contact of the toxic contents of the bag with the user. At the same time, the only waste is in the form of a bag which may be made of recyclable plastic, hence minimizing waste associated with the system.

U.S. Pat. No. 5,154,319 appears to disclose a beverage concentrate container that includes an integrally connected piston pump as a concentrate dosing unit. The container and piston pump are insertable into rigid support within a beverage dispenser cabinet for mechanical interconnection with a drive mechanism for the pump. The container and pump combination (syrup package) are fabricated from materials which are disposable.

U.S. Patent Application Publication Number 2006/0101575 appears to disclose a dispensing system and method, and injector therefor. The disclosed dispensing system, when used for washing hands, may include a faucet in communication with a water or other supply line and a soap or other substance dispensing device adapted to create, for example, a soap and water mixture in the supply line. The system may provide an injector which may include at least one vortex generator to create strong vortices that effectively commingle the two fluids into a thoroughly dispersed mixture, for discharging from the faucet outlet or other outlet.

German Patent Number DE 102012216817 appears to disclose a metering device for a fluid that is designed for use on a dispensing device for the fluid or a remote metering device for conveying the fluid. The device includes a housing, with a fluid inlet and several fluid outlets, a gearwheel which is rotatably mounted in the housing and is thus enclosed in a gearwheel chamber in the housing and which has a cavity between two adjacent teeth and the housing for fluid transport, one or more chamber inlets that are fluidly connected to the fluid inlet and the gear chamber such that fluid can flow into the gear chamber, and one or more chamber outlets that are connected to the one or more fluid outlets and the gear chamber are fluidly connected such that fluid in the cavities between the gear and the wall of the gear wheel the berm is conveyed to the chamber outlet(s) and can flow to the fluid outlet(s), which is characterized by a measuring device for non-contact optical detection of the rotational speed of the gear wheel.

While the above-identified patents and publications do appear to disclose dispenser assemblies, their configurations remain non-desirous and/or problematic inasmuch as, among other things, none of the above-identified assemblies and/or systems appear to be uniquely adapted to, among other things, precisely dispense cleaning concentrate into a container which is then filled with water to complete the solution using intelligent technologies.

It is therefore an object of the present invention to provide a dispenser and/or dosing assembly that is uniquely adapted to intelligently and precisely dispense the appropriate amount of cleaning product for subsequent dilution and use.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a cleaning concentrate dispenser assembly, comprising, consisting essentially of, and/or consisting of: a housing sub-assembly; an energy source; an RFID reader; a level sensor; a controller (printed circuit board); a cleaning concentrate reservoir; a dispensing pump; and a cleaning concentrate output.

In a preferred embodiment of the present invention, the cleaning concentrate dispenser further comprises at least one of a spray bottle, a pump sprayer, a bucket, and a container having an RFID chip associated therewith.

In another preferred implementation of the present invention, the cleaning concentrate dispenser assembly comprises one or more structural, functional, and/or ornamental characteristics as disclosed herein—including, but not limited to, those shown in the figures herein.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
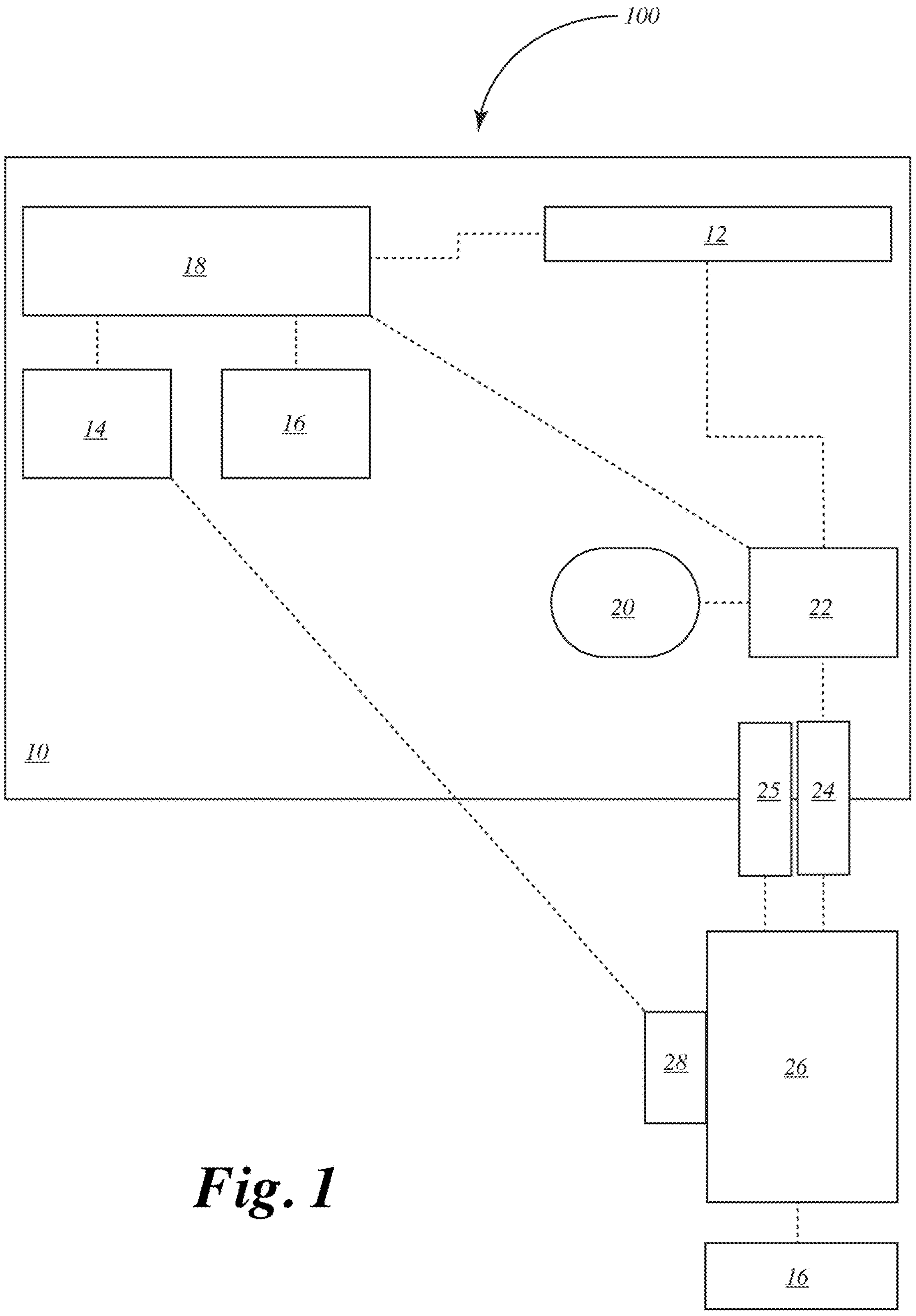
Figure 2:
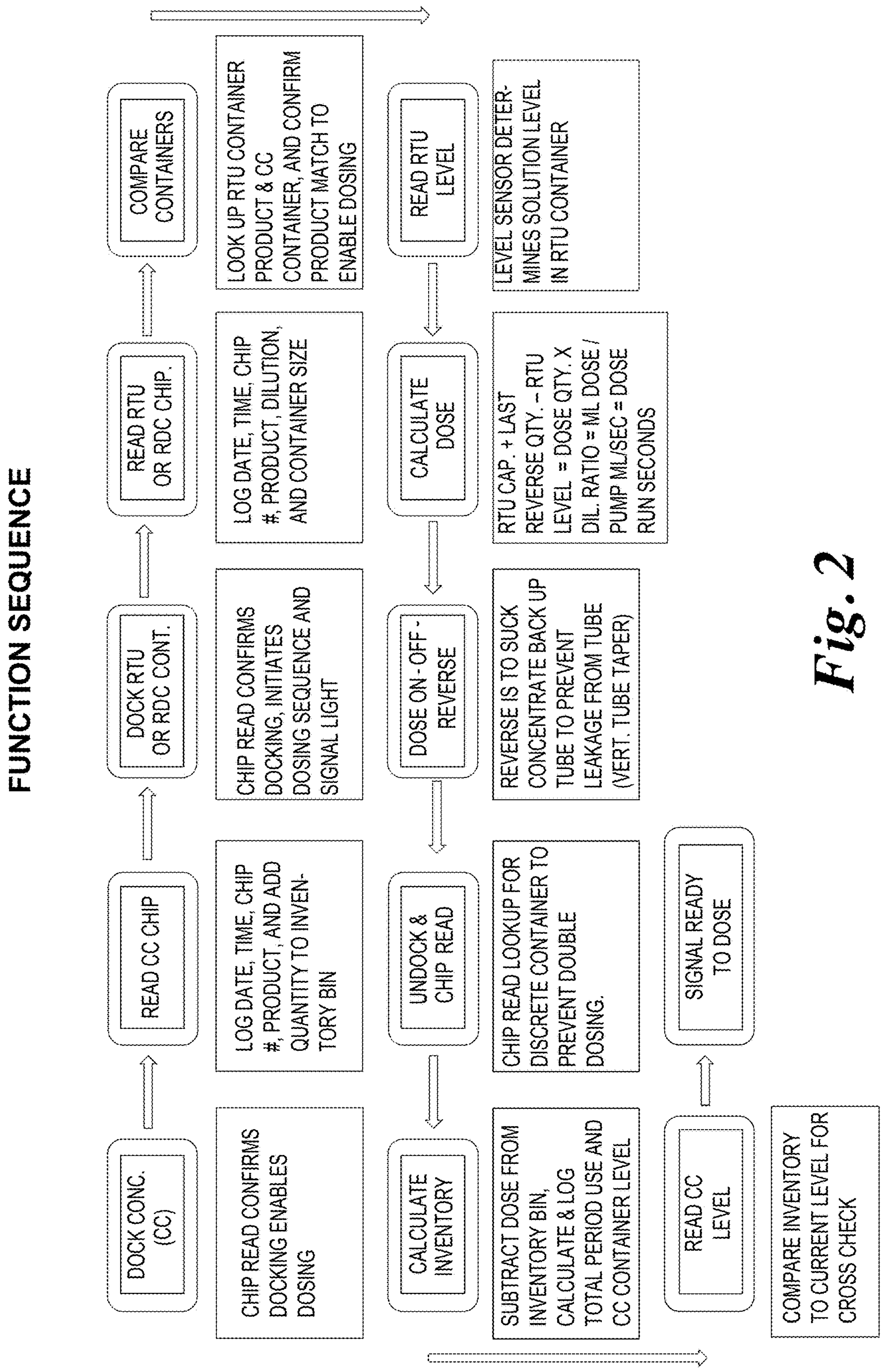
Figure 3:
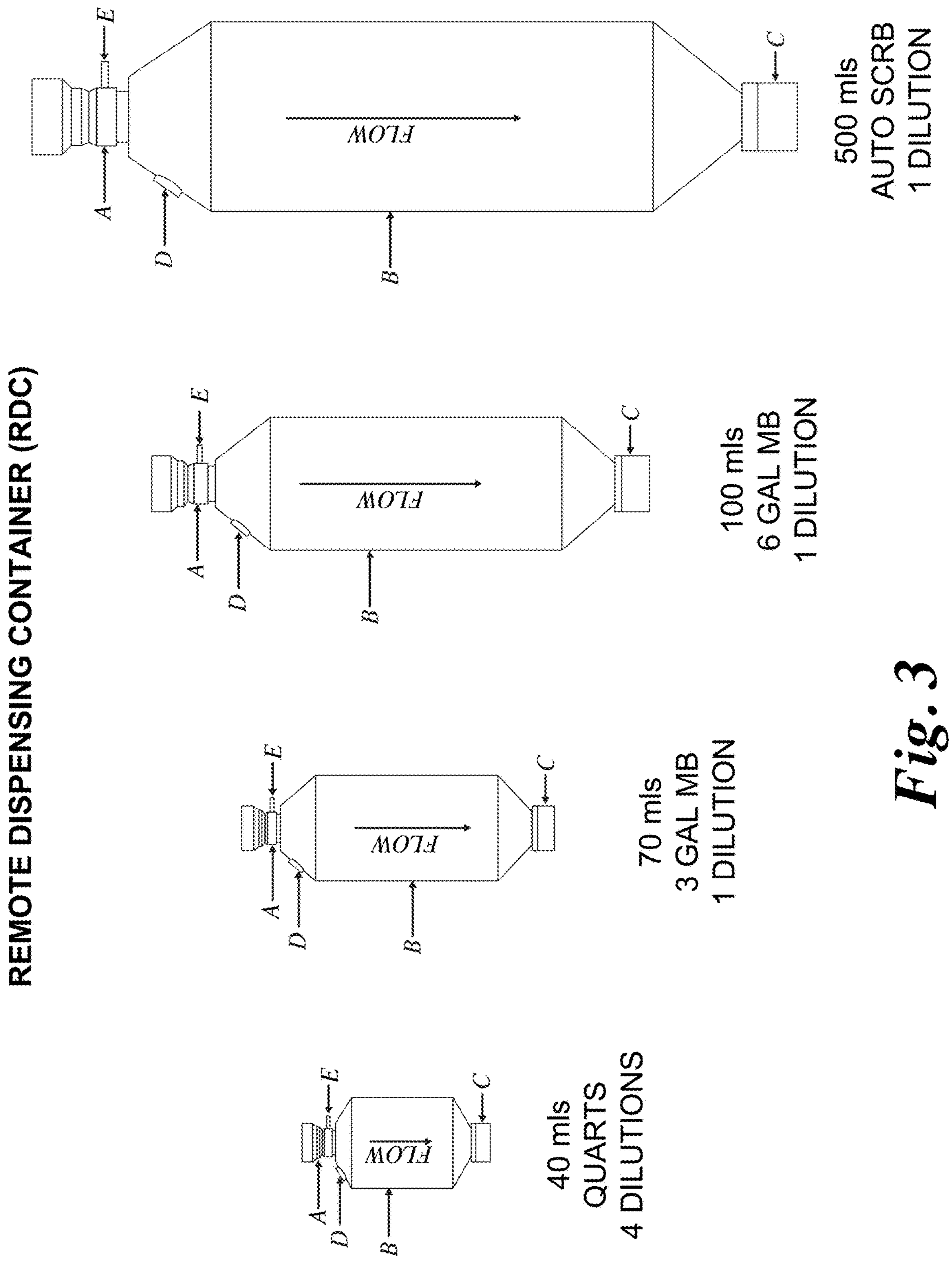
Figure 4:
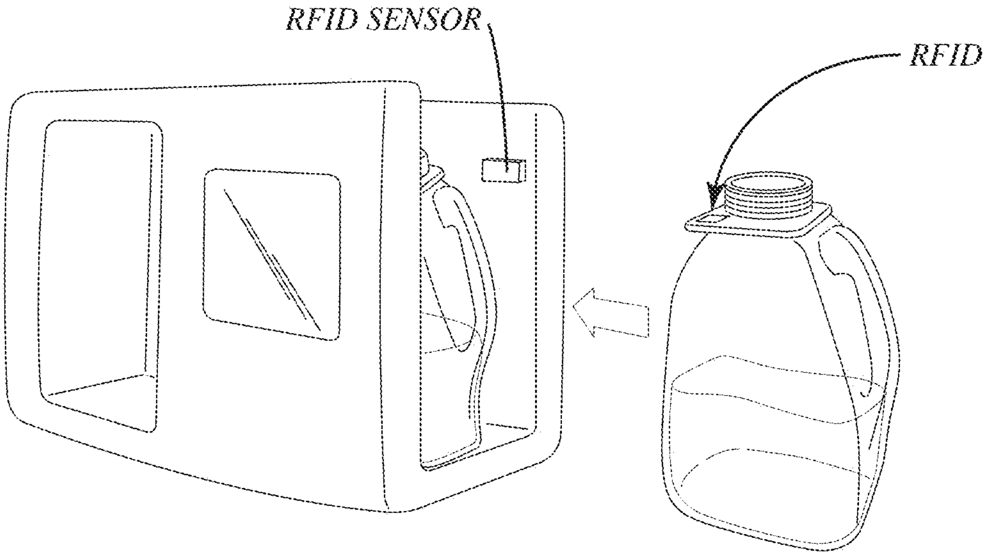
Figure 5:
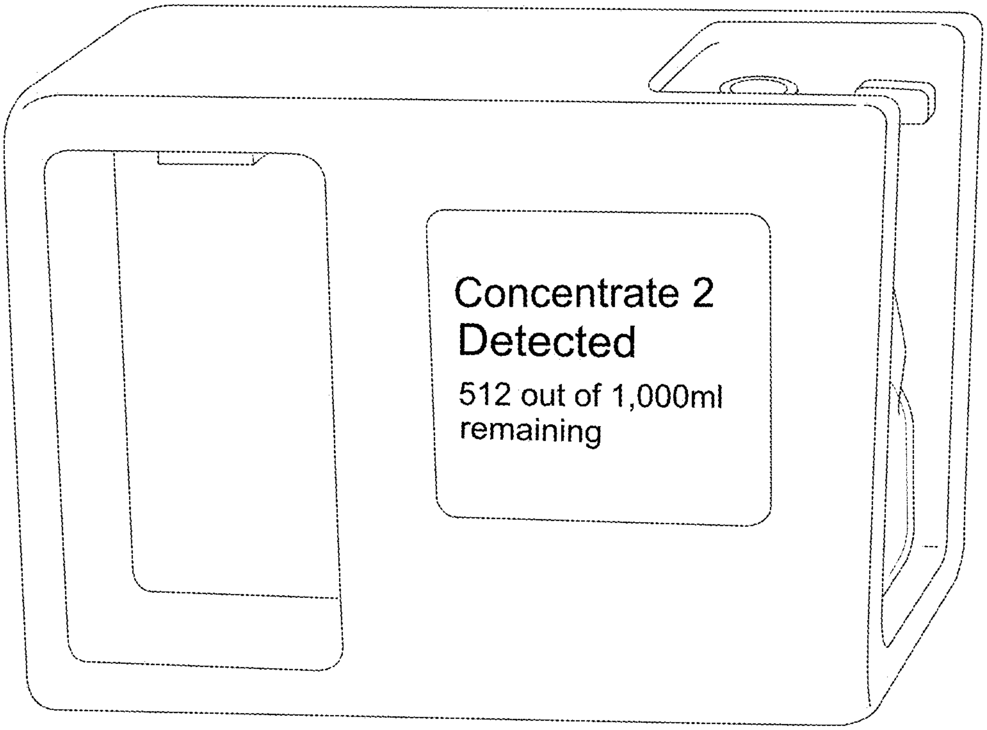
Figure 6:
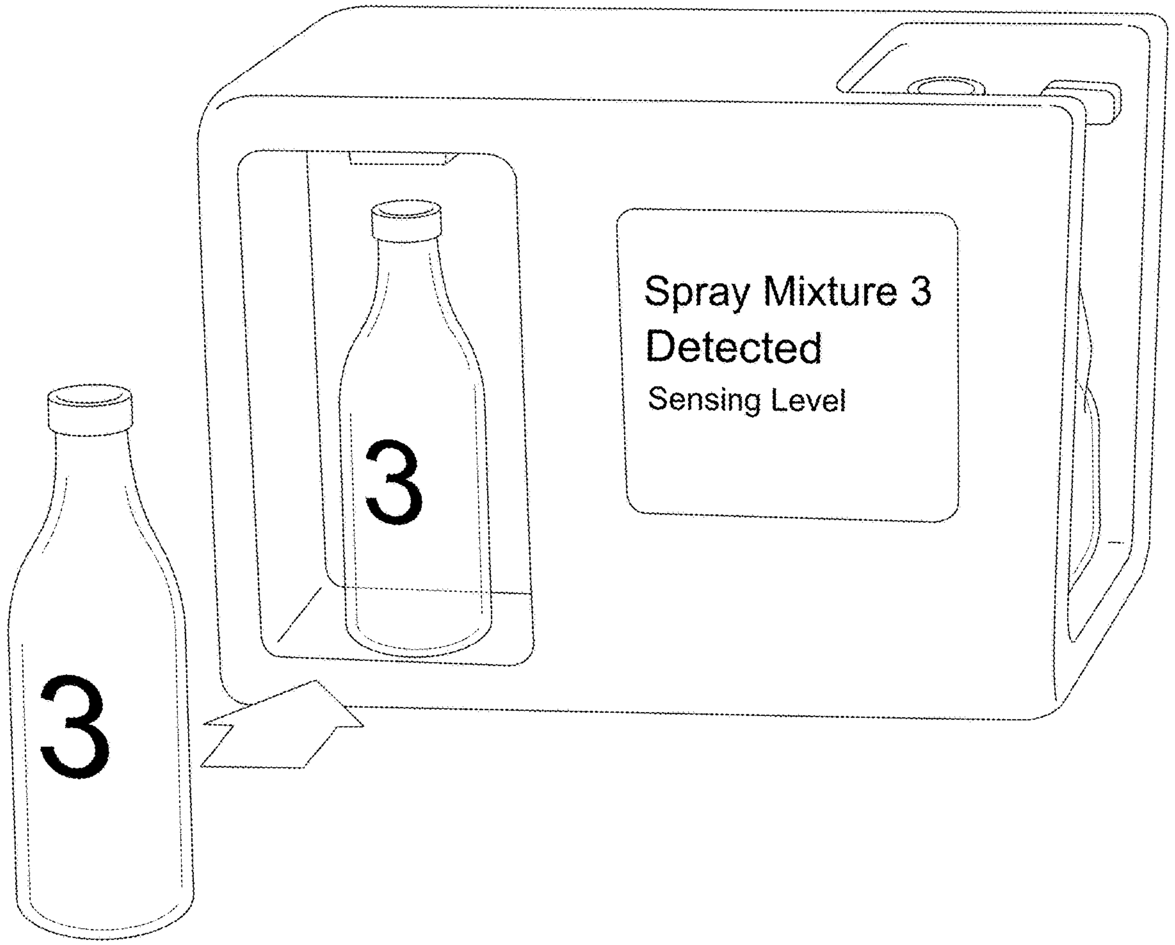
Figure 7:
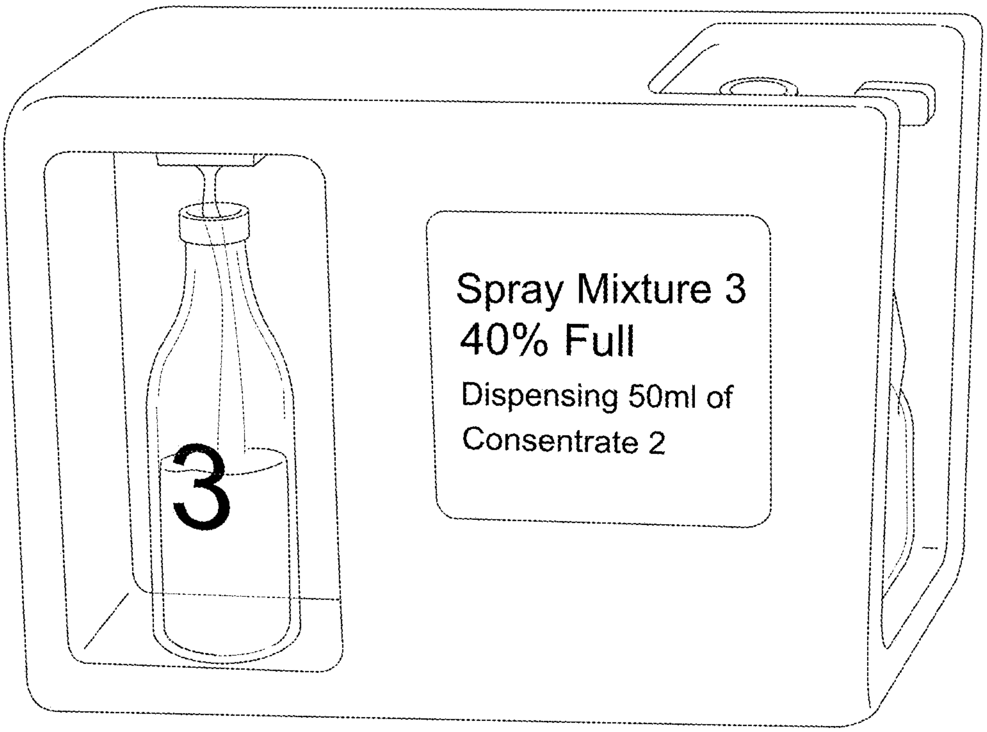
Figure 8:
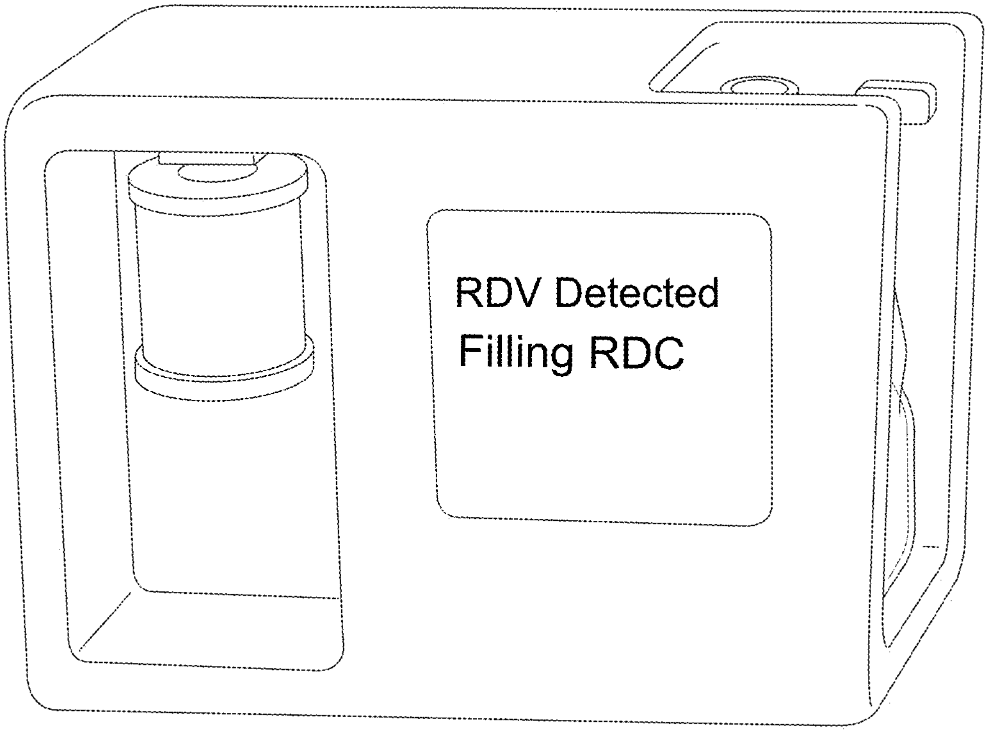
Figure 9:
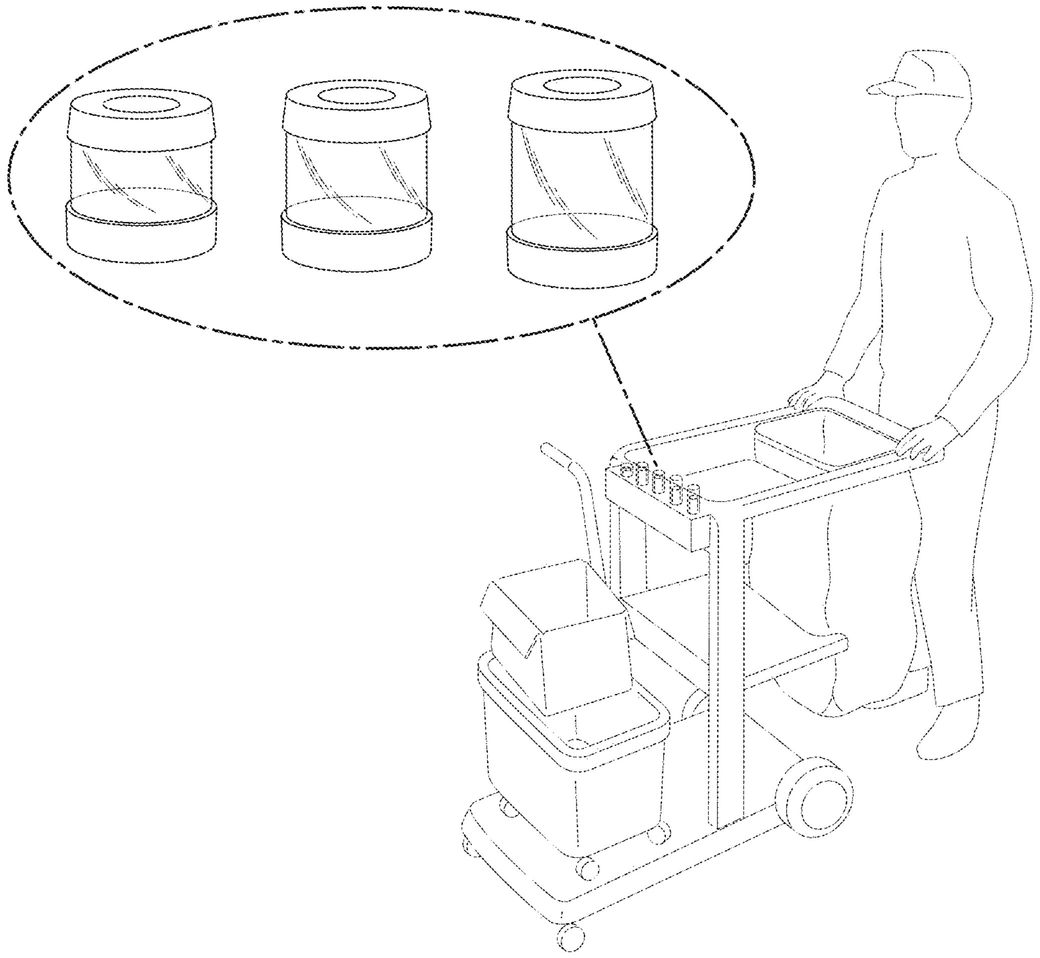
Figure 10:
Figure 11:

The invention will now be described with reference to the drawings wherein:

FIG. 1 is a schematic representation of a cleaning concentrate dispenser assembly fabricated in accordance with the present invention;

FIG. 2 is a schematic representation of a function sequence utilized in accordance with the present invention;

FIG. 3 is a representation of remote dispensing containers (RDC) for use in accordance with the present invention; and FIGS. 4-11 are representations of certain components and associated processes of the present invention.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Referring now to the drawings, and to FIG. 1 in particular, cleaning concentrate dispenser assembly 100, is shown as generally comprising: housing sub-assembly 10; energy source 12; RFID reader 14; primary and secondary level sensors/pressure sensors/measuring sensors 16; controller (printed circuit board) 18; cleaning concentrate reservoir 20; dispensing pump 22; cleaning concentrate output 24; and optional water reservoir/supply output 25. Preferably, cleaning concentrate dispenser assembly 100 further includes a spray bottle, a pump sprayer, a bucket, and/or container 26 having RFID chip 28 associated therewith. In one embodiment, RFID chip 28 is secured to an outer surface of container 26, forms part of container 26, and/or is sandwiched between the inner and outer surfaces of container 26.

Provided below in table format is a component listing of a preferred embodiment of the present invention.

the current industry standard water driven vacuum metering system allowing direct introduction of concentrated chemical into RTU containers which are then topped off with water from any location. Preferably, the assembly uses an automated process whereby product is dispensed, concentrated cleaning chemical is introduced into end-use RTU containers enabled by a docking mechanism that senses a discrete use end-user container, its product, dilution rate, and current solution level information. The assembly also preferably includes on-board self-diagnostics, on-board data collection, data transmission capability off-site, and/or water availability not required at dispensing station.

In another preferred implementation of the present invention, the dispenser assembly includes a housing that docks to spray bottles, mop buckets, or auto scrubbers, and when docked, reads information including type of product in the container, water dilution rate, and current RTU solution level. From that information, it calculates quantity of concentrated chemical to be dispensed. Signal lights are provided to indicate when docking is complete, dosing is in progress, and complete. Spray bottles will preferably contain RFID chip. Mop buckets, auto-scrubbers and other end-use containers will preferably have remote docking tubes with an RFID chip. The RFID chips will be discrete to each end-use container or device. Each spray bottle, or docking tube, is preferably color coded, labeled, and dedicated to a particular product and dilution. The dispenser only measures the correct product to the correct end-use container, and is preferably powered by battery and/or conventional AC current.

TABLE I

| Manufacturer | MPN | Description | Qty | Area |
|---|---|---|---|---|
| Kamoer | KPHM 400 | Kamoer KPHM 400 stepper peristaltic pump 24 V 400 ml/min | 1 | Pump |
| Microchip | ATSAMD51J19A-AUT | MCU 32-bit ARM Cortex M4F RISC 512 KB Flash 3.3 V 64-Pin TQFPT/R | 1 | MCU |
| Diodes, Inc. | AP61100Z6-7 | DCDC CONV LV BUCK, SOT 563, T&R, 3K | 1 | Power |
| Wurth Elec | 78438356010 | FIXED IND 1 UH 7.2 A 15 MOHM SMD | 1 | Power |
| Microchip | MIC5249-3.3YMM | IC REG LINEAR 3.3 V 300 MA 8MSOP | 1 | Power |
| Murata | CR1220 | Battery Lithium 3 V CO IN 12.5 MM | 1 | RTC |
| Adam Tech | BH-44D-5 | BATT HOLDER CO IN 12 MM 1 CELL SMD | 1 | RTC |
| Seiko Instruments | SC32S-7PF20PPM | CRYSTAL 32.7680 KHZ 7 PF SMD | 1 | RTC |
| Mean Well | GST40A24-P1M | AC/DC DESKTOP ADAPTER 24 V 40 W | 1 | Power Adapter |
| Trinamic Motion Control | TMC2209-LA-T | Bipolar Motor Driver Power MOSFET Step/Direction, UART 28-QFN (5 × 5) | 1 | Motor Control |
| STMicroelectronics | ST25R95-VMD5T | NFC/HF RFID READER IC | 2 | RFID Reader |
| Nuvoton Technology | NAU7802SGI | 24 Big Analog to Digital Converter 2 Input 1 Sigma-Delta 16-SOP | 1 | Load Cell |
| Microchip | ATWINC1500-MR210PB1 | Wifi 802.11 b/g/n Transceiver Module 2.4 GHz Integrated, Trace Surface Mount | 1 | Wifi |
| Sharp | LS027B7DH01 | 2.7" WQVGA (400 × 240) None nits Landscape LED Backlight No Touch LCD | 1 | Display |
| TE Connectivity | 1-84953-0 | 10 Positions FPC Connector Contacts, Top 0.039" (1.00 mm) Surface Mount, Right Angle | 1 | Display |
| PCB Unlimited | | Assembly | 1 | |
| PCB Unlimited | | Board, PCB, 3" × 3", ENIG, 4 layer | 1 | |
| Misc | | Simple parts, assume 5% of cost | 1 | |

In a preferred implementation of the present invention, the dispenser assembly is a wall mounted, or portable, metering dispenser of liquid cleaning chemical that replaces In yet another preferred implementation of the present invention, the dispenser assembly includes a dosing unit that stores quantity of concentrate dispensed, date and time of dose, container ID, size, and product. The RFID chip preferably has a discrete code that can be linked to a custodian, location, facility, and/or customer. Data is preferably dumped to a central station, accumulated from all units at a facility, and transmitted to the manufacturer on a periodic basis. It will be understood that data transmission for purposes of the present invention, can occur via one or more components on and/or associated with the controller and/or as a stand-alone component separate and apart from the controller. Non-limiting means for transmitting data include, for example, cable, radio frequency, Bluetooth, cellular, WiFi, etcetera.

In accordance with the present invention, software preferably calculates concentrate and resulting RTU product used. A perpetual inventory of concentrate can then be maintained for each dispenser, all filling stations per location, and total customer. This data can be used for many things, namely: (1) management reports and alerts to customer on use of RTUs by custodian and location compared to standards and history (This helps ensure that the right product is used in the right quantity, on a timely basis, to keep the facility clean); (2) provide use information to facilitate customer's order system, or for auto ship direct to customer locations, or auto ship to central customer warehouse; (3) possible to bill for concentrate or RTU product used rather than product delivered, eliminating cost of inventory, inventory control, purchasing, and delivery control; and (4) alerts to customer for malfunctions, or significant under and/or over use. As is best shown in FIG. 2, the present invention preferably utilizes one or more function sequence(s).

In a preferred embodiment of the present invention, the system delivers precise chemical concentrate that enables ultra-concentrated product to be diluted at high levels not currently possible with water driven dispensing. This facilitates reduction of plastic waste & transportation energy per gallon of ready-to-use cleaning products of 95% or more.

In a preferred implementation of the present invention, the concentrate or product comprises a gas, a liquid, a solid (e.g., a powder, a wire, etcetera), and/or combinations thereof.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims and drawings.

What is claimed and desired to be secured by Letters Patent of the United States is:

1. A cleaning concentrate dispenser assembly, comprising:

- a housing sub-assembly;
- an energy source operatively connected to said housing sub-assembly and configured to provide power for automated operations;
- an RFID reader configured to identify specific cleaning concentrate products and container types;
- a level sensor configured to determine solution levels and calculate required dosing quantities;
- a controller comprising a printed circuit board operatively connected to said RFID reader and said level sensor, wherein said controller is configured to:

collect and store dispensing data including quantity dispensed, date and time of dispensing, container identification, and product type, calculate perpetual inventory of cleaning concentrate for inventory management, generate usage analytics comparing actual use to predetermined standards, and transmit said dispensing data and usage analytics to a remote management system;

a cleaning concentrate reservoir;

a dispensing pump operatively connected to said controller and configured for precise volumetric dispensing; and a cleaning concentrate output fluidly connected to said dispensing pump.

2. The cleaning concentrate dispenser assembly of claim 1, wherein said controller is further configured to execute a function sequence comprising reading RTU container level, calculating required dose quantity based on container capacity and dilution ratio, and logging dispensing data with date, time, and container identification.

3. The cleaning concentrate dispenser assembly of claim 2, wherein said function sequence further comprises reading cleaning concentrate chip identification, comparing RTU container product with cleaning concentrate container product to confirm product matching, and enabling dosing only upon confirmed product compatibility.

4. The cleaning concentrate dispenser assembly of claim 3, wherein said controller subtracts dispensed dose quantity from inventory bin calculations and logs total period usage for inventory management reporting.

5. The cleaning concentrate dispenser assembly of claim 4, wherein said dispensing pump comprises a peristaltic pump having stepper motor control for precise volumetric dispensing at dilution ratios exceeding 500:1.

6. The cleaning concentrate dispenser assembly of claim 5, wherein said dispensing pump includes reverse flow capability to prevent concentrate leakage from dispensing tube after dosing completion.

7. The cleaning concentrate dispenser assembly of claim 6, wherein said level sensor comprises primary and secondary level sensors configured to determine solution levels in both RTU containers and cleaning concentrate reservoirs.

8. The cleaning concentrate dispenser assembly of claim 7, wherein said level sensors provide cross-check verification by comparing inventory calculations to current measured levels.

9. The cleaning concentrate dispenser assembly of claim 8, further comprising a display interface configured to provide real-time dispensing status and dosing confirmation signals.

10. The cleaning concentrate dispenser assembly of claim 9, wherein said display interface provides signal lights indicating docking completion, dosing in progress, and dosing completion status.

11. The cleaning concentrate dispenser assembly of claim 10, wherein said usage analytics include comparison of RTU product usage by custodian and location relative to predetermined cleaning standards and historical usage patterns.

12. The cleaning concentrate dispenser assembly of claim 11, wherein said controller generates management reports and alerts for significant over-use or under-use conditions relative to facility cleaning requirements.

13. The cleaning concentrate dispenser assembly of claim 12, wherein said remote management system comprises centralized data collection from multiple dispenser units and automated reorder processing based on usage analytics.

14. The cleaning concentrate dispenser assembly of claim 13, wherein said controller facilitates automated shipping of cleaning concentrate directly to customer locations based on calculated inventory depletion rates.

15. A cleaning concentrate dispenser assembly, consisting of: a housing sub-assembly; an energy source operatively connected to said housing sub-assembly; an RFID reader configured to identify cleaning concentrate products and container types; a level sensor configured to determine solution levels; a controller comprising a printed circuit board operatively connected to said RFID reader and said level sensor; a cleaning concentrate reservoir; a dispensing pump operatively connected to said controller; a cleaning concentrate output fluidly connected to said dispensing pump; and remote dispensing containers (RDCs) having different volume capacities for various cleaning applications.

16. The cleaning concentrate dispenser assembly of claim 15, wherein said RDCs include 40 ml capacity for quart containers with four dilutions, 70 ml capacity for 3-gallon mop buckets with single dilution, 100 ml capacity for 6-gallon mop buckets with single dilution, and 500 ml capacity for auto scrubber applications with single dilution.

17. The cleaning concentrate dispenser assembly of claim 15, wherein said RFID reader identifies discrete container codes linkable to specific custodian, location, facility, and customer identification for comprehensive usage tracking.

18. A cleaning concentrate dispenser assembly, consisting of: a housing sub-assembly; an energy source; an RFID reader that identifies discrete container codes linkable to specific custodian, location, facility, and customer identification for comprehensive usage tracking; a level sensor; a controller comprising a printed circuit board that collects and transmits dispensing data to a remote management system; a cleaning concentrate reservoir; a peristaltic pump with stepper motor control for precise volumetric dispensing; and a cleaning concentrate output.

19. The cleaning concentrate dispenser assembly of claim 18, wherein said peristaltic pump includes stepper motor control providing precise volumetric dispensing at dilution ratios exceeding 500:1.

20. The cleaning concentrate dispenser assembly of claim 18, wherein said controller generates management reports and alerts for significant over-use or under-use conditions relative to facility cleaning requirements.

* * * * *